(12) United States Patent
Chou

(10) Patent No.: US 10,884,459 B1
(45) Date of Patent: Jan. 5, 2021

(54) ELECTRONIC DEVICE AND MOVING MODULE THEREOF

(71) Applicant: CHICONY ELECTRONICS CO., LTD., New Taipei (TW)

(72) Inventor: Sheng-Sung Chou, New Taipei (TW)

(73) Assignee: CHICONY ELECTRONICS CO., LTD.

( * ) Notice: Subject to any disclaimer, the term of this patent is extended or adjusted under 35 U.S.C. 154(b) by 0 days.

(21) Appl. No.: 16/803,728

(22) Filed: Feb. 27, 2020

(30) Foreign Application Priority Data

Sep. 26, 2019 (TW) .............................. 108134950 A

(51) Int. Cl.
*G06F 1/16* (2006.01)
(52) U.S. Cl.
CPC .......... *G06F 1/1658* (2013.01); *G06F 1/1616* (2013.01); *G06F 1/1686* (2013.01)
(58) Field of Classification Search
CPC combination set(s) only.
See application file for complete search history.

(56) References Cited

U.S. PATENT DOCUMENTS

| 6,812,958 | B1* | 11/2004 | Silvester | G06F 1/1607 |
| | | | | 348/207.1 |
| 7,057,888 | B2* | 6/2006 | Oakley | G06F 1/1601 |
| | | | | 361/679.23 |
| 7,563,040 | B2* | 7/2009 | Tsai | G03B 17/02 |
| | | | | 348/374 |
| 8,242,924 | B2* | 8/2012 | Huang | G06F 1/1616 |
| | | | | 340/686.1 |
| 8,496,390 | B2* | 7/2013 | Ohuchi | H04N 5/2252 |
| | | | | 396/448 |
| 8,531,832 | B2* | 9/2013 | Wu | G03B 11/041 |
| | | | | 361/679.55 |
| 8,582,797 | B2* | 11/2013 | Wang | H04R 5/04 |
| | | | | 381/386 |
| 9,307,129 | B2* | 4/2016 | Oh | G06F 1/16 |
| 9,465,276 | B2* | 10/2016 | Jonsson | G06F 1/1656 |
| 9,661,202 | B2* | 5/2017 | Oh | H04M 1/673 |
| 9,829,770 | B1* | 11/2017 | Gustaveson, II | G03B 11/04 |
| 9,921,610 | B2* | 3/2018 | Lu | H05K 5/0217 |

(Continued)

FOREIGN PATENT DOCUMENTS

| CN | 2665761 Y | 10/2015 |
| TW | I502314 B | 10/2015 |

*Primary Examiner* — Lisa Lea-Edmonds
(74) *Attorney, Agent, or Firm* — Muncy, Geissler, Olds & Lowe, P.C.

(57) ABSTRACT

The present disclosure discloses an electronic device, which includes a housing having a plurality of openings, a plurality of functional elements and a moving module. The moving module includes a carrier plate, a magnetic member, an elastic member and an electromagnet. The carrier plate is movably disposed on the housing, and moved between a first position and a second position. The functional elements are disposed on the carrier plate. When the carrier plate is located at either the first position or the second position, each of the functional elements is corresponding to one of the openings. The magnetic member is disposed on a first end of the carrier plate. One end of the elastic member is connected to the housing, and the other end is fixed to a second end of the carrier plate. The electric magnet is adjacent to the first end of the carrier plate.

16 Claims, 7 Drawing Sheets

(56) References Cited

U.S. PATENT DOCUMENTS

| | | | |
|---|---|---|---|
| 10,070,021 B1* | 9/2018 | Rolle | H04N 5/2252 |
| 10,122,898 B2* | 11/2018 | Chang | H04N 5/23218 |
| 10,317,776 B2* | 6/2019 | Gustaveson, II | H04N 5/2257 |
| 10,416,709 B2* | 9/2019 | Hu | H04N 5/2253 |
| 10,481,469 B2* | 11/2019 | Chen | G03B 9/08 |
| 10,571,959 B2* | 2/2020 | Liao | G06F 1/1684 |
| 10,609,190 B2* | 3/2020 | Chen | H04M 1/0216 |
| 10,637,978 B2* | 4/2020 | Fan | H04M 1/0266 |
| 10,656,680 B2* | 5/2020 | Fan | G06F 1/1647 |
| 10,761,404 B2* | 9/2020 | Leimer | G03B 11/041 |
| 10,802,548 B2* | 10/2020 | Wu | G06F 1/1616 |
| 2006/0006674 A1* | 1/2006 | Kang | G06F 1/1616 |
| | | | 292/251.5 |
| 2010/0046151 A1* | 2/2010 | Baller | G06F 1/1688 |
| | | | 361/679.01 |
| 2010/0166414 A1* | 7/2010 | Zhang | G03B 11/043 |
| | | | 396/448 |
| 2011/0115924 A1* | 5/2011 | Yu | G06F 1/1686 |
| | | | 348/207.11 |
| 2019/0033927 A1* | 1/2019 | Youm | G06F 1/1616 |
| 2020/0159971 A1* | 5/2020 | Cho | G06F 21/79 |
| 2020/0301479 A1* | 9/2020 | Chen | G06F 1/206 |

* cited by examiner

ELECTRONIC DEVICE AND MOVING MODULE THEREOF

BACKGROUND

1. Technical Field

The present disclosure relates to an electronic device, and more particularly, to a moving member of the electronic device.

2. Description of the Related Art

An image sensing element (lens) of the camera module of an electronic device with a display screen, such as a mobile phone, tablet computer, notebook, or All-In-One computer, is usually disposed on the border of the display screen and commonly disposed on the upper side of the border.

Since the users of electronic products are concerned about network security and privacy, many such users cover the lens of the camera module with a sticker to prevent other parties from using the camera to invade their privacy. However, it is quite inconvenient to remove the sticker to use the camera. In addition, the current electronic devices have no structural improvements to prevent the aforementioned invasion of privacy.

SUMMARY

In view of the above problems, the main object of the present disclosure is to provide an electronic device and a moving module thereof, wherein the moving module moves a functional element to a different position when privacy is needed, thereby solving the problem that conventional electronic devices have no structural improvements to prevent the invasion of privacy.

In order to achieve the above object, the present disclosure provides an electronic device comprising a housing, a plurality of functional elements and a moving module. The housing has a plurality of openings. The moving module comprises a carrier plate, a magnetic member, an elastic member and an electromagnet. The carrier plate has a first end and second end opposite to each other. The carrier plate is movably disposed on the housing and moves between a first position and a second position. The functional elements are disposed on the carrier plate such that when the carrier plate is located at either the first position or the second position, each of the functional elements is corresponding to one of the openings. The magnetic member is disposed on the first end of the carrier plate. One end of the elastic member is connected to the housing, and the other end is connected to the second end of the carrier plate. The electromagnet is disposed on the housing and is adjacent to the first end of the carrier plate. When the electronic device is in a first mode, the electromagnet is activated, the magnetic member is attracted by a magnetic attraction from the electromagnet, and the carrier plate is moved from the first position to the second position. When the electronic device is in a second mode, the electromagnet is deactivated, and the carrier plate is moved back to the first position by an elastic force provided by the elastic member.

In order to achieve the above object, the present disclosure further provides a moving module applied in an electronic device, which comprises a plurality of functional elements and a housing having a plurality of openings. The moving module comprises a carrier plate, a magnetic member, an elastic member and an electromagnet. The carrier plate has a first end and a second end opposite to each other. The carrier plate is movably disposed on the housing and moves between a first position and a second position. The functional elements are disposed on the carrier plate such that when the carrier plate is located at either the first position or the second position, each of the functional elements is corresponding to one of the openings. The magnetic member is disposed on the first end of the carrier plate. One end of the elastic member is connected to the housing, and the other end is connected to the second end of the carrier plate. The electromagnet is disposed on the housing and is adjacent to the first end of the carrier plate. When the electronic device is in a first mode, the electromagnet is activated, the magnetic member is attracted by a magnetic attraction from the electromagnet, and the carrier plate is moved from the first position to the second position. When the electronic device is in a second mode, the electromagnet is deactivated and the carrier plate is moved back to the first position by an elastic force provided by the elastic member.

According to an embodiment of the present disclosure, the first mode is a privacy mode, and the second mode is an operating mode. When the carrier plate is located at the first position, the functional elements are corresponding to the openings. When the carrier plate is located at the second position, the functional elements are blocked by the housing.

According to an embodiment of the present disclosure, the moving module further comprises a switch, which is disposed on the first end of the carrier plate and coupled to at least a portion of the functional elements. When the carrier plate is moved to the second position, the switch deactivates at least a portion of the functional elements.

According to an embodiment of the present disclosure, the first mode is an operating mode, and the second mode is a privacy mode. When the carrier plate is located at the first position, the functional elements are blocked by the housing. When the carrier plate is located at the second position, the functional elements are corresponding to the openings.

According to an embodiment of the present disclosure, the moving module further comprises a switch, which is disposed on the second end of the carrier plate and coupled to at least a portion of the functional elements. When the carrier plate is moved to the second position, the switch deactivates at least a portion of the functional elements.

According to an embodiment of the present disclosure, the moving module further comprises a limiting member disposed on the housing and adjacent to the second end of the carrier plate. When the carrier plate is located at the first position, the limiting member abuts the second end of the carrier plate.

According to an embodiment of the present disclosure, the moving module further comprises a guiding track disposed on the housing. The carrier plate has a convex protrusion disposed in the guiding track.

According to an embodiment of the present disclosure, the functional elements comprise an image sensing element, a proximity sensor, a microphone module, or an indicating light.

According to an embodiment of the present disclosure, the electronic device further comprises a processing module coupled to the functional elements. When a user is close to the electronic device, the proximity sensor transmits a sensing signal to the processing module. When the processing module does not receive the sensing signal for more than a predetermined time, the processing module deactivates at least a portion of the functional elements.

As described above, according to the electronic device and the moving module of the present disclosure, the moving module comprises the carrier plate, the magnetic member, the elastic member and the electromagnet. The carrier plate and the electromagnet are disposed on the housing of the electronic device, the magnetic member and the elastic member are respectively disposed at two opposite ends of the carrier plate, and the magnetic member is adjacent to the electromagnet. The carrier plate can be moved between the first position and the second position by the aforementioned structure. Further, the functional elements (such as the image sensing element) are disposed on the carrier plate, and when the carrier plate is located at either the first position or the second position, the functional elements are respectively corresponding to the openings of the housing. Thus, when a user needs privacy, the carrier plate can be moved such that the functional elements are blocked by the housing to achieve the effect of preventing other parties from using the functional elements to invade the user's privacy.

DETAILED DESCRIPTION OF THE EMBODIMENTS

In order to make the structure and characteristics as well as the effectiveness of the present disclosure further understood and recognized, a detailed description of the present disclosure is provided as follows, along with embodiments and accompanying figures.

Figure 1:
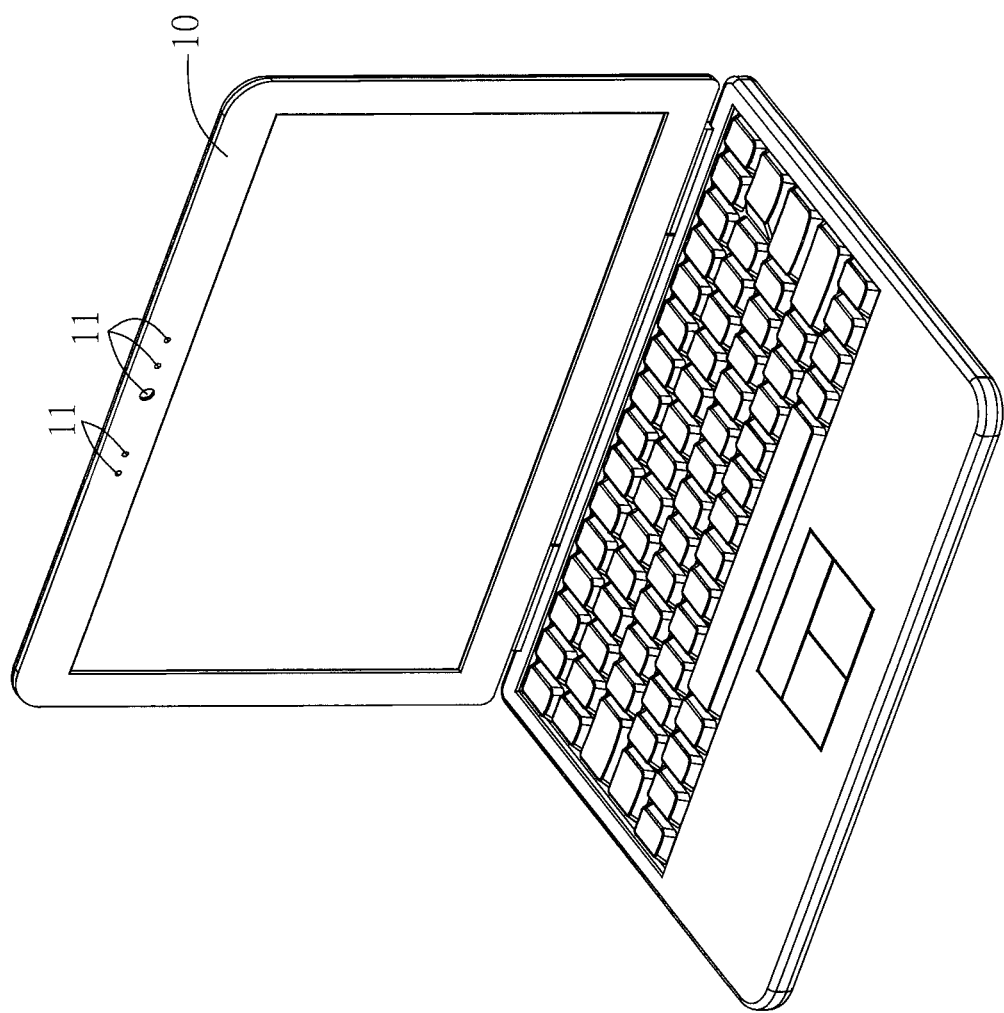
FIG. 1 illustrates a schematic view of an electronic device according to an embodiment of the present disclosure.
Figure 2:
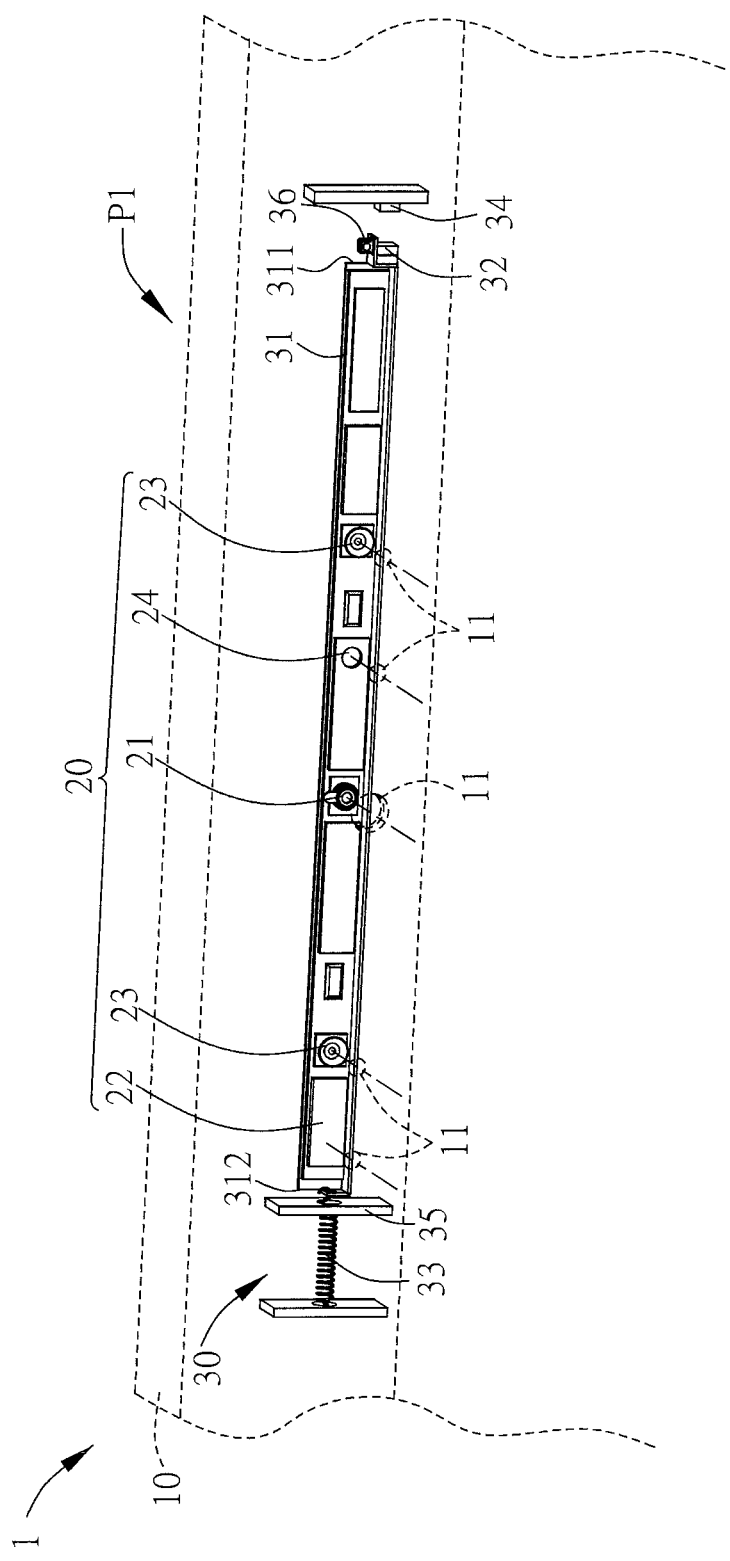
FIG. 2 illustrates a partial enlarged view of the inside of a frame of the electronic device shown in FIG. 1.

Please refer to FIG. 1 and FIG. 2, wherein FIG. 1 illustrates a schematic view of an electronic device according to an embodiment of the present disclosure and FIG. 2 illustrates a partial enlarged view of the inside of a frame of the electronic device shown in FIG. 1. In the present embodiment, the electronic device 1 comprises a housing 10, a plurality of functional elements 20 and a moving module 30. The electronic device 1 can be, but is not limited to, a mobile phone, a tablet computer, a notebook, an all-in-one computer (All in One PC), or a display screen. The housing 10 has a plurality of openings 11 located on the upper side of a frame of the electronic device 1. In the present embodiment, the functional elements 20 mainly refer to electronic elements that are related to network security and privacy; for example, the functional element 20 can be an image sensing element (lens) 21 of a camera module disposed on the upper side of the frame of the electronic device 1. In addition, the functional elements 20 can also be other electronic elements adjacent to the image sensing element (lens) 21; they can be, for example but not limited to, a proximity sensor 22, a microphone module 23 or an indicating light 24 of the camera module.

Figure 3:
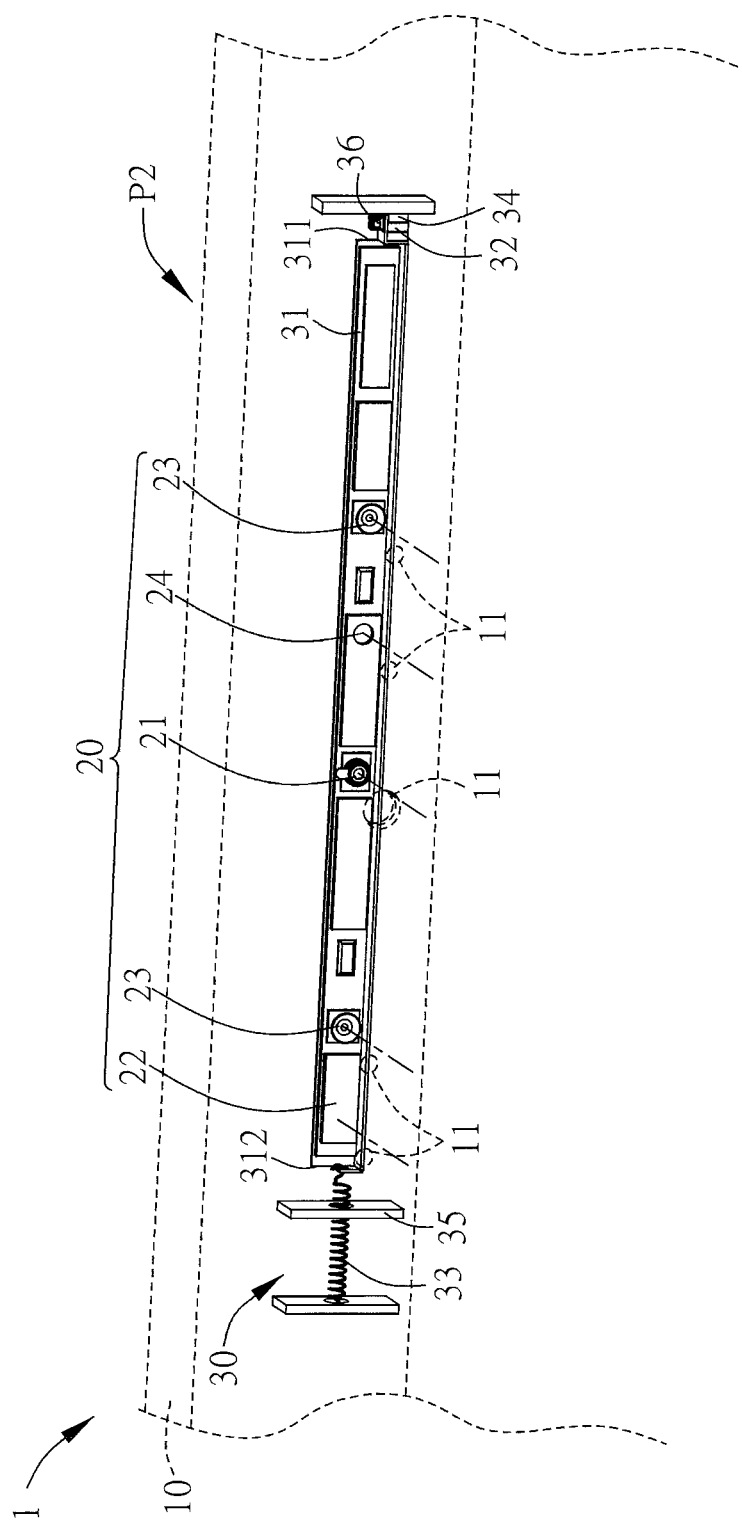
FIG. 3 illustrates a schematic view of the carrier plate located at a second position shown in FIG. 2.

The moving module 30 comprises a carrier plate 31, a magnetic member 32, an elastic member 33 and an electromagnet 34. The carrier plate 31 is disposed on the housing 10 and has a first end 311 and a second end 312 opposite to each other. The carrier plate 31 of this embodiment can be moved between a first position P1 and a second position P2, as shown in FIG. 2 and FIG. 3. FIG. 2 illustrates a schematic view of the carrier plate 31 located at the first position P1; FIG. 3 illustrates a schematic view of the carrier plate 31 located at the second position P2 shown in FIG. 2. Further, the functional elements 20 are disposed on the carrier plate 31. When the carrier plate 31 is located at the first position P1 or the second position P2, each of the functional elements 20 is corresponding to one of the openings 11. In this embodiment, when the carrier plate 31 is located at the first position P1, one functional element 20 corresponds to one opening 11.

In this embodiment, the carrier plate 31 and the functional elements 20 are driven by the magnetic member 32, the elastic member 33 and the electromagnet 34 to move between the first position P1 and the second position P2. Specifically, the electromagnet 34 is disposed on the housing 10 and adjacent to the first end 311 of the carrier plate 31. Correspondingly, the magnetic member 32 is disposed on the first end 311 of the carrier plate 31. The magnetic member 32 is a member that can be attracted by a magnetic force, and preferably can be a permanent magnet. Further, one end of the elastic member 33 is fixed to the housing 10, and the other end of the elastic member 33 is connected to the second end 312 of the carrier plate 31. When the electromagnet 34 is activated, the magnetic member 32 can be attracted by the magnetic attraction from the electromagnet 34 such that the carrier plate 31 is moved from the first position P1 to the second position P2 by the aforementioned structure. At this time, the magnetic member 32 and the electromagnet 34 are in contact with and attract each other.

Figure 4:
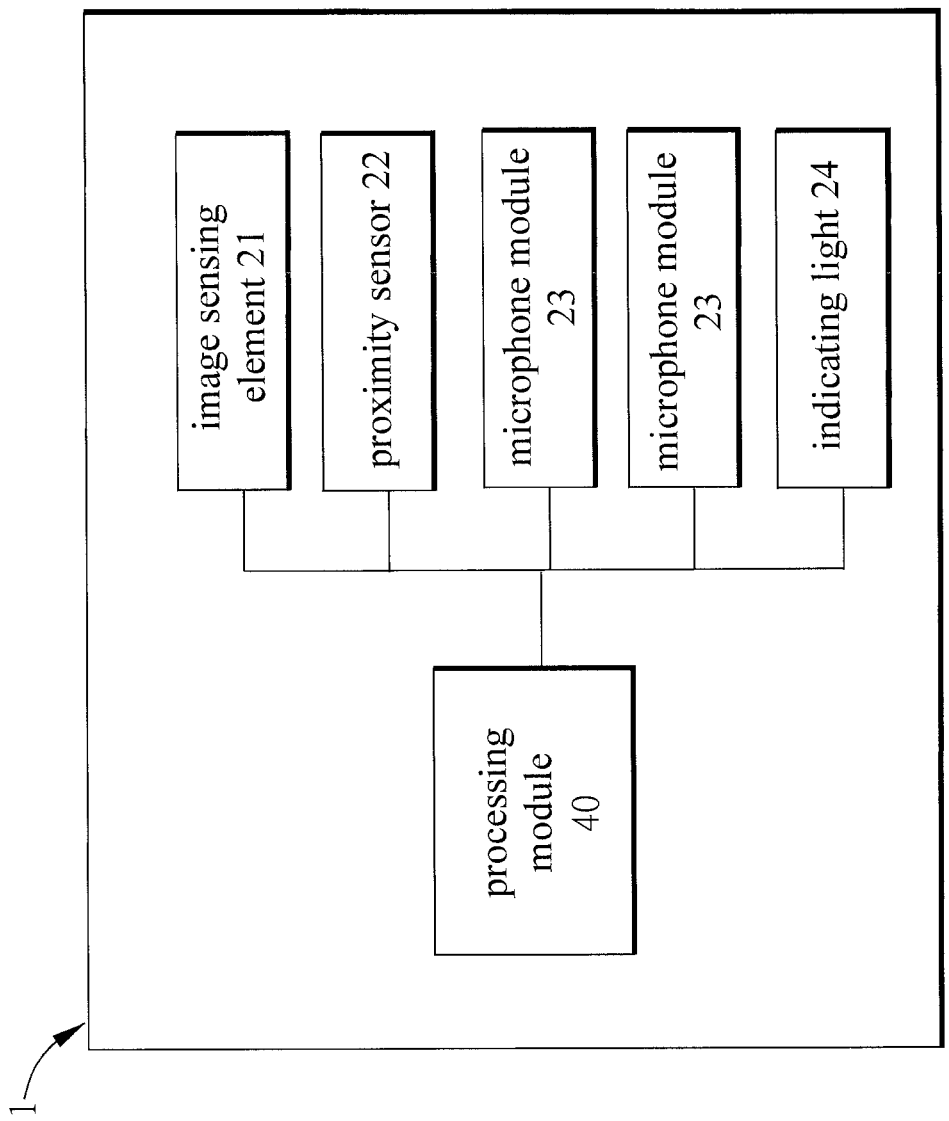
FIG. 4 illustrates a block diagram of the electronic device shown in FIG. 1.

Please also refer to FIG. 4, which illustrates a block diagram of the electronic device shown in FIG. 1. The electronic device 1 comprises a processing module 40, which can activate or deactivate the electromagnet 34. In this embodiment, the processing module 40 can be set to a first mode (privacy mode) when a user needs privacy, and the processing module 40 activates the electromagnet 34. At this time, the carrier plate 31 is moved together with the functional elements 20 from the first position P1 to the second position P2, such that the functional elements 20 are blocked by the housing 10. In other words, when the electronic device 1 is in the first mode (privacy mode), the electromagnet 34 is activated and the magnetic member 32 is attracted by a magnetic attraction from the electromagnet 34, such that the carrier plate 31 is moved from the first position P1 to the second position P2. The functional elements 20 are also moved from the position of corresponding to the openings 11 to the position of being blocked by the housing 10. Since the image sensing element 21 is blocked by the housing 10, the invasion of privacy by other parties can be prevented.

Further, the elastic member 33 of this embodiment can be an extension spring. When the carrier plate 31 is moved to the second position P2, the elastic member 33 T is elongated to be in a deformed (stretched) state. When the user needs to use the camera, the processing module 40 initiates a second mode (operating mode) and deactivates the electromagnet 34. At this time, the elastic member 33 provides an elastic force (i.e., a restoring force) to drive the carrier plate 31 to move back to the original position. In other words, when the electronic device 1 is in the second mode (operating mode), the electromagnet 34 is deactivated and the elastic member 33 provides the elastic force to drive the carrier plate 31 to return from the second position P2 to the first position P1. The functional elements 20 are also moved from the position of being blocked by the housing 10 to the position of corresponding to the openings 11; that is, the image sensing element 21 is corresponding to the opening 11 such that the user can use the photographing function.

Preferably, the moving module 30 further comprises a limiting member 35, which is disposed on the housing 10 and adjacent to the second end 312 of the carrier plate 31. When the carrier plate 31 is moved back to the first position P1, the limiting member 35 abuts the second end 312 of the carrier plate 31 to prevent the elastic force provided by the elastic member 33 being so large that the carrier plate 31 moves beyond the first position P1. In other words, the functional elements 20 can be moved back to the position corresponding to the opening 11 by the design of the limiting member 35 such that the functions of the functional elements 20 can be used, such as the photographing function, the sound collecting function and the proximity sensing function.

Preferably, the moving module 30 further comprises a switch 36, which is coupled to at least a portion of the functional elements 20. For example, the switch 36 of this embodiment is coupled to the image sensing element 21 and the microphone module 23. When the carrier plate 31 is moved to the second position P2 (i.e., in the privacy mode), the switch 36 deactivates at least a portion of the functional elements 20, such as the image sensing element 21 and the microphone module 23. The photographing function of the image sensing element 21 is deactivated to prevent unauthorized image capturing, and the sound collecting function of the microphone module 23 is also deactivated to prevent eavesdropping. Further, the switch 36 can be, for example but not limited to, a mechanical switch, a capacitive switch, or a resistive switch. The switch 36 only needs to be triggered to deactivate at least of a portion of the functional elements 20 when the carrier plate 31 is moved to the second position P2. For example, the switch 36 is disposed on the first end 311 of the carrier plate 31. When the carrier plate 31 is moved to the second position P2, the switch 36 contacts a blocking wall or other structures having the electromagnet 34, and the switch 36 is triggered to deactivate the image sensing element 21 and the microphone module 23.

Please refer to FIG. 4. The processing module 40 of this embodiment is coupled to the functional elements 20, such as the image sensing element 21, the proximity sensor 22, the microphone module 23 and the indicating light 24. When the user is close to the electronic device 1, for example, when the user is using the electronic device 1, the proximity sensor 22 is able to transmit a sensing signal to the processing module 40. When the user moves away from the electronic device 1, the proximity sensor 22 stops transmitting the sensing signal to the processing module 40. When the processing module 40 does not receive the sensing signal for more than a predetermined time (such as 10 minutes, or any amount of time set by the user), the processing module 40 deactivates at least a portion of the functional elements 20, such as the image sensing element 21 and the microphone module 23. In other words, if the user stays away from the electronic device 1 for more than the predetermined time (e.g., >10 minutes), the processing module 40 deactivates the image sensing element 21 and the microphone module 23 to prevent privacy violations such as unauthorized image capturing or eavesdropping.

Figure 5:
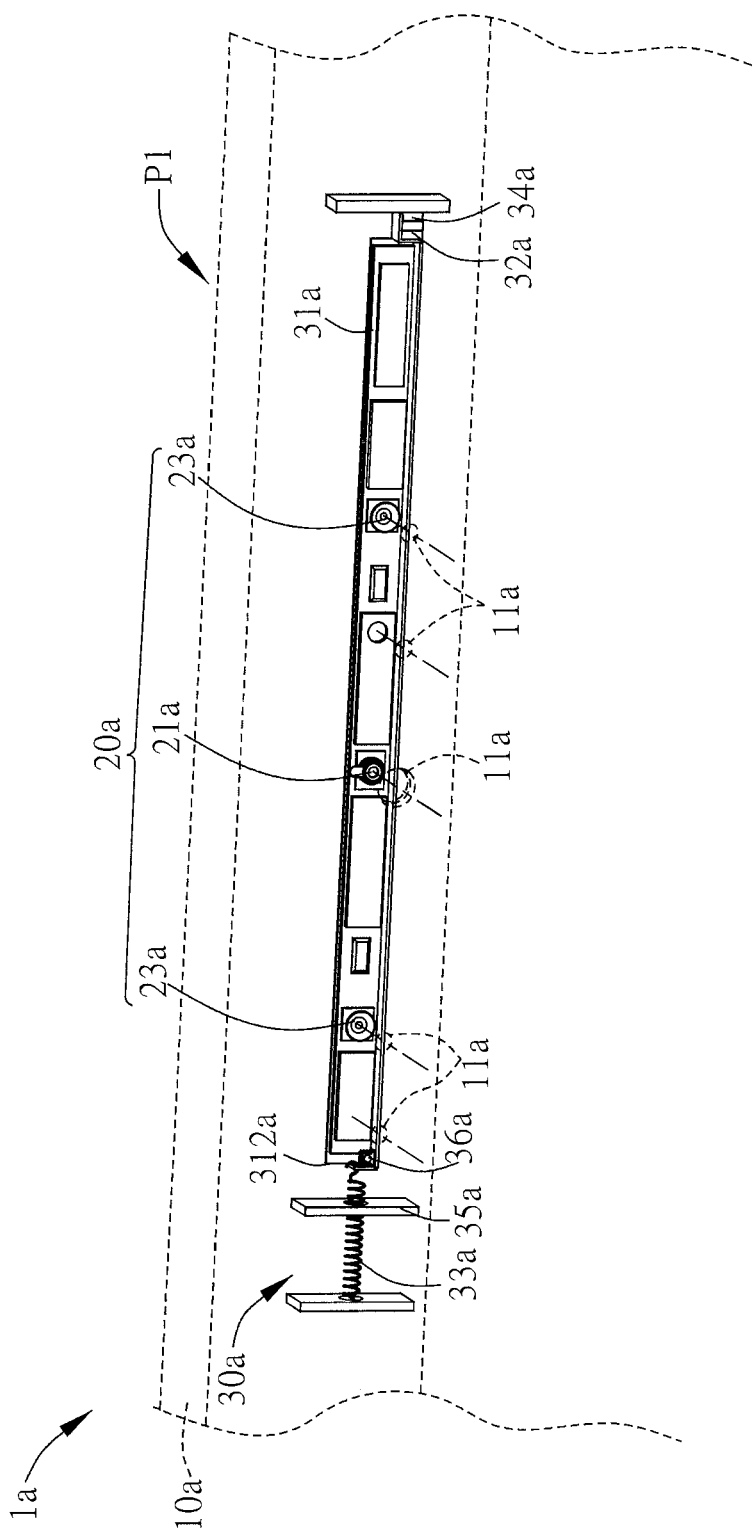
FIG. 5 illustrates a partial enlarged view of an electronic device according to another embodiment of the present disclosure.
Figure 6:
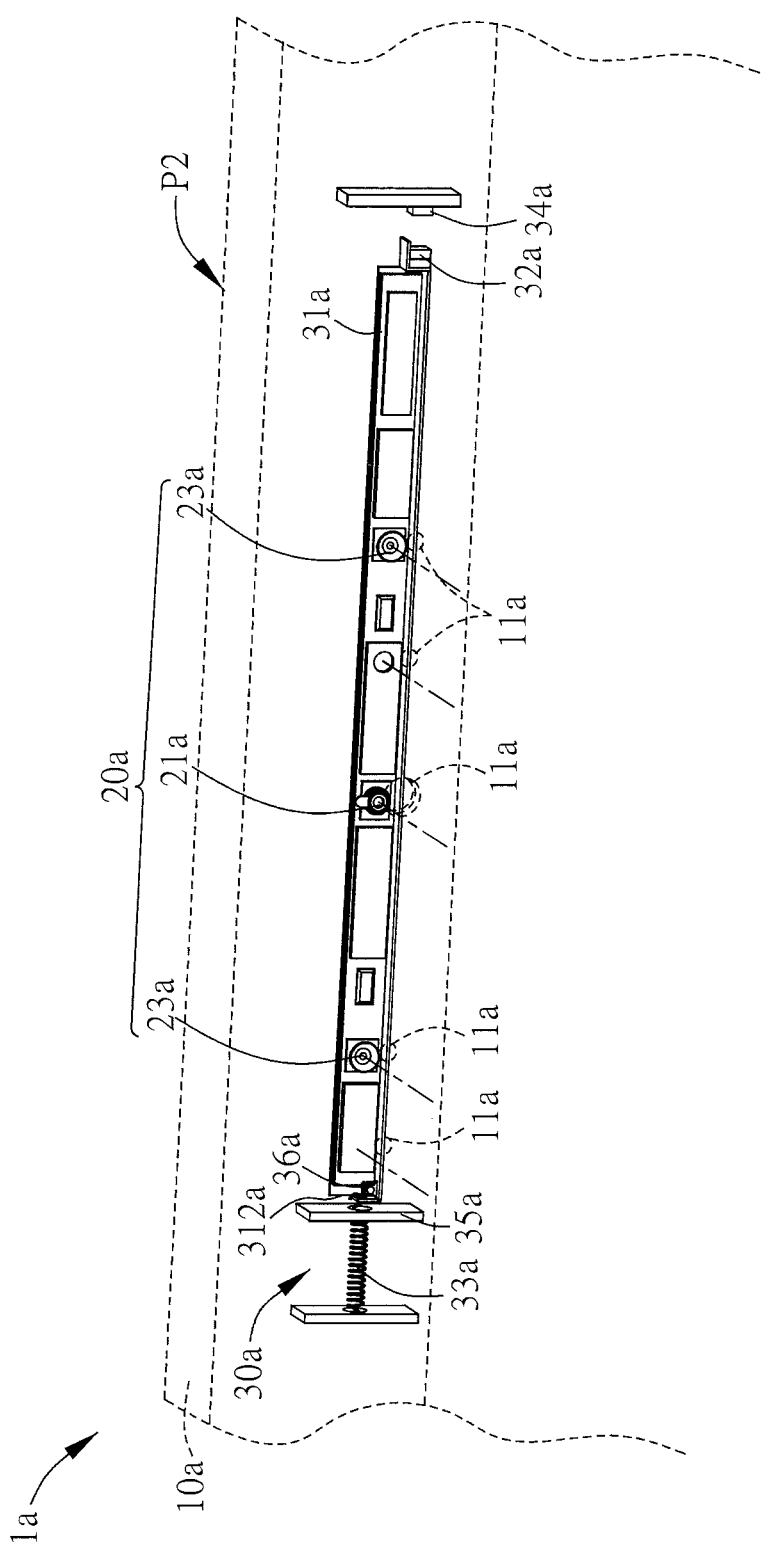
FIG. 6 illustrates a schematic view of the carrier plate located at a second position shown in FIG. 5.

Please refer to FIG. 1, FIG. 5 and FIG. 6. FIG. 5 illustrates a partial enlarged view of an electronic device 1a according to another embodiment of the present disclosure, and FIG. 6 illustrates a schematic view of the carrier plate located at a second position shown in FIG. 5. This embodiment is substantially the same as the members and connections of the foregoing embodiments, and the main difference is that when the carrier plate 31 is located at the first position P1, the functional elements 20a are blocked by the housing 10a (as shown in FIG. 5), and when the carrier plate 31a is located at the second position P2, the functional elements 20a are corresponding to the openings 11a respectively.

In this embodiment, when the user uses the photographing function, the electronic device 1a is in the first mode (i.e., the operating mode), so the electromagnet 34a is activated and the magnetic member 32a is attracted by a magnetic force from the electromagnet 34a. The carrier plate 31a moves to (or remains in) the second position P2 such that the functional elements 20a correspond to the openings 11a respectively and the user can use the photographing function, as shown in FIG. 5. When the user needs to use the privacy function, the electronic device 1a is switched to the second mode (the privacy mode), and the electromagnet 34a is deactivated. At this time, the elastic member 33a provides an elastic force to drive the carrier plate 31a to move to the first position P1 such that the functional elements 20a are blocked by the housing 10a to prevent other parties from using the functional elements 20a without the user's permission.

In this embodiment, the moving module 30a further comprises a switch 36a, which is disposed on the second end 312 of the carrier plate 31a and coupled to at least a portion of the functional elements 20a, such as the image sensing element 21a and the microphone module 23a. When the carrier plate 31a is moved to the second position P2, the switch 36a contacts the limiting member 35a (or other structures) and is triggered to deactivate the image sensing element 21a and the microphone module 23a to prevent unauthorized image capturing and eavesdropping.

Figure 7:
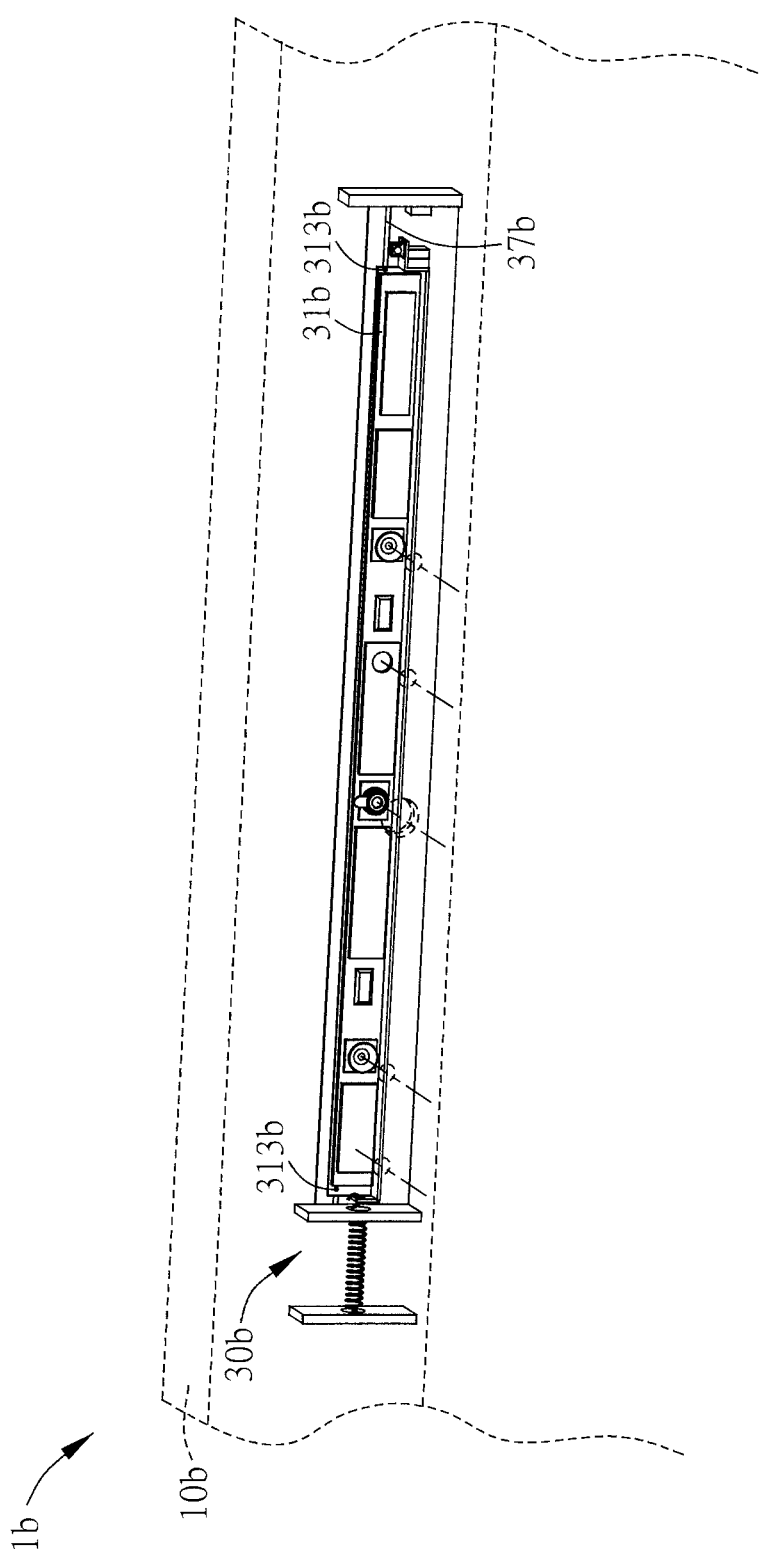
FIG. 7 illustrates a partial enlarged view of an electronic device according to a further embodiment of the present disclosure.

Please refer to FIG. 7. FIG. 7 illustrates a partial enlarged view of an electronic device 1b according to a further embodiment of the present disclosure. In this embodiment, the moving module 30b further comprises a guiding track 37b, which is disposed on the housing 10b. Correspondingly, the carrier plate 31b has a convex protrusion 313b disposed in the guiding track 37b. The convex protrusion 313b moves in the guiding track 37b to guide the carrier plate 31b to move between the first position P1 and the second position P2 (refer to FIG. 3). In another embodiment, the guiding track can directly be formed on the housing, and it can also achieve the function of guiding the carrier plate to move between the first position and the second position.

Furthermore, the present disclosure also provides a moving module applied in an electronic device. The electronic device comprises a plurality of functional elements and a housing having a plurality of openings. The moving module comprises a carrier plate, a magnetic member, an elastic member and an electromagnet. The structure and the connections of the members or elements of the moving module are as described in the aforementioned embodiment and will not be described in detail herein.

As described above, according to the electronic device and the moving module of the present disclosure, the moving module comprises a carrier plate, a magnetic member, an elastic member and an electromagnet. The carrier plate and the electromagnet are disposed on the housing of the electronic device, the magnetic member and the elastic member are respectively disposed at two opposite ends of the carrier plate, and the magnetic member is adjacent to the electromagnet. The carrier plate can be moved between the first position and the second position by the aforementioned structure. Further, the functional elements (such as the image sensing element) are disposed on the carrier plate such that when the carrier plate is located at either the first position or the second position, the functional elements are respectively corresponding to the openings of the housing. Thus, when a user needs privacy, the carrier plate can be moved such that the functional elements are blocked by the housing to achieve the effect of preventing unauthorized use of the functional elements.

It is noted that the above-described embodiments are merely illustrative of preferred embodiments of the present disclosure, and that in order to prevent redundancy, not all possible combinations of variations are described in detail; various changes and modifications may be made to the described embodiments without departing from the scope of the disclosure as described by the appended claims.

What is claimed is:

1. An electronic device, comprising:
   a housing, having a plurality of openings;
   a plurality of functional elements; and
   a moving module, comprising:
   a carrier plate, having a first end and a second end opposite to each other, the carrier plate being disposed on the housing and moving between a first position and a second position, and the functional elements being disposed on the carrier plate; when the carrier plate is located at either the first position or the second position, each of the functional elements is corresponding to one of the openings;
   a magnetic member disposed on the first end of the carrier plate;
   an elastic member, one end being connected to the housing and the other end being connected to the second end of the carrier plate; and
   an electromagnet disposed on the housing and adjacent to the first end of the carrier plate,
   when the electronic device is in a first mode, the electromagnet is activated, the magnetic member is attracted by a magnetic attraction from the electromagnet, and the carrier plate is moved from the first position to the second position,
   when the electronic device is in a second mode, the electromagnet is deactivated and the carrier plate is moved back to the first position by an elastic force provided by the elastic member.

2. The electronic device as claimed in claim 1, wherein the first mode is a privacy mode and the second mode is an operating mode; when the carrier plate is located at the first position, the functional elements are corresponding to the openings, and when the carrier plate is located at the second position, the functional elements are blocked by the housing.

3. The electronic device as claimed in claim 2, wherein the moving module further comprises a switch, which is disposed on the first end of the carrier plate and coupled to at least a portion of the functional elements; when the carrier plate is moved to the second position, the switch deactivates at least a portion of the functional elements.

4. The electronic device as claimed in claim 1, wherein the first mode is an operating mode and the second mode is a privacy mode; when the carrier plate is located at the first position, the functional elements are blocked by the housing, and when the carrier plate is located at the second position, the functional elements are corresponding to the openings.

5. The electronic device as claimed in claim 4, wherein the moving module further comprises a switch, which is disposed on the second end of the carrier plate and coupled to at least a portion of the functional elements; when the carrier plate is moved to the second position, the switch deactivates at least a portion of the functional elements.

6. The electronic device as claimed in claim 1, wherein the moving module further comprises a limiting member disposed on the housing and adjacent to the second end of the carrier plate; when the carrier plate is located at the first position, the limiting member abuts the second end of the carrier plate.

7. The electronic device as claimed in claim 1, wherein the moving module further comprises a guiding track disposed on the housing and the carrier plate has a convex protrusion disposed in the guiding track.

8. The electronic device as claimed in claim 1, wherein the functional elements comprise an image sensing element, a proximity sensor, a microphone module, or an indicating light.

9. The electronic device as claimed in claim 8, further comprising a processing module coupled to the functional elements; when a user is close to the electronic device, the proximity sensor transmits a sensing signal to the processing module, and when the processing module does not receive the sensing signal for more than a predetermined time, the processing module deactivates at least a portion of functional elements.

10. A moving module, applied in an electronic device comprising a plurality of functional elements and a housing having a plurality of openings, the moving module comprising:
    a carrier plate, having a first end and a second end opposite to each other, the carrier plate being disposed on the housing and moving between a first position and a second position and the functional elements being disposed on the carrier plate; when the carrier plate is located at either the first position or the second position, each of the functional elements is corresponding to one of the openings;
    a magnetic member disposed on the first end of the carrier plate;
    an elastic member, one end being connected to the housing and the other end being connected to the second end of the carrier plate; and
    an electromagnet disposed on the housing and adjacent to the first end of the carrier plate,
    when the electronic device is in a first mode, the electromagnet is activated, the magnetic member is attracted by a magnetic attraction from the electromagnet, and the carrier plate is moved from the first position to the second position,
    when the electronic device is in a second mode, the electromagnet is deactivated and the carrier plate is moved back to the first position by an elastic force provided by the elastic member.

11. The moving module as claimed in claim 10, wherein the first mode is a privacy mode and the second mode is an operating mode; when the carrier plate is located at the first position, the functional elements are corresponding to the openings, and when the carrier plate is located at the second position, the functional elements are blocked by the housing.

12. The moving module as claimed in claim 11, further comprising a switch, which is disposed on the first end of the carrier plate and coupled to at least a portion of the functional elements; when the carrier plate is moved to the second position, the switch deactivates at least a portion of the functional elements.

13. The moving module as claimed in claim 10, wherein the first mode is an operating mode and the second mode is a privacy mode; when the carrier plate is located at the first position, the functional elements are blocked by the housing, and when the carrier plate is located at the second position, the functional elements are corresponding to the openings.

14. The moving module as claimed in claim 13, further comprising a switch, which is disposed on the second end of the carrier plate and coupled to at least a portion of the functional elements; when the carrier plate is moved to the second position, the switch deactivates at least a portion of the functional elements.

15. The moving module as claimed in claim 10, further comprising a limiting member disposed on the housing and adjacent to the second end of the carrier plate; when the carrier plate is located at the first position, the limiting member abuts the second end of the carrier plate.

16. The moving module as claimed in claim 15, further comprising a guiding track disposed on the housing, and the carrier plate has a convex protrusion disposed in the guiding track.

* * * * *